United States Patent Office 3,480,546
Patented Nov. 25, 1969

3,480,546
AQUEOUS FOAM CONTAINING A WATER-SWELLABLE POLYMER FLAMEPROOFING COMPOSITION AND PROCESS OF MAKING SAME
Robert N. Bashaw, Freeport, and Billy G. Harper, Lake Jackson, Tex., assignors to The Dow Chemical Company, Midland, Mich., a corporation of Delaware
No Drawing. Filed Feb. 28, 1964, Ser. No. 348,301
Int. Cl. A62d 1/00
U.S. Cl. 252—3
8 Claims

ABSTRACT OF THE DISCLOSURE

The invention relates to a foaming concentrate containing a spumiferous agent and a water-dispersable, water-swellable polymer in particulate form and a process of making same into a gelled aqueous foam for use in fighting fires.

---

The present invention relates to improved foams useful as vapor and thermal barriers. More particularly, the invention concerns gelled aqueous foams having excellent utility in fire fighting.

Among the various known applications of foams as vapor and thermal barriers is their use as blankets to smother and cool fires. One type of fire, viz., gasoline and the like hydrocarbon fed fire, is most difficult to control and foams utilized for fighting such fires must be characterized by a high cooling capacity as well as substantial cohesiveness.

It would be desirable, and it is an object of the present invention, to provide a composition and method whereby water is converted to an effective fire fighting agent for hydrocarbon fed fires. A further and more general object is to provide an improved aqueous foam useful as a vapor and thermal barrier in the combating of all types of fires. A still further object of the invention is to provide an aqueous foam having a high capacity for cooling and blanketing fires, which foam will float on the surface of flammable liquids having densities less than that of water. These objects, and other benefits as will become apparent hereinafter, are accomplished in the present invention.

The invention is comprised of several aspects or embodiments among which is a foaming concentrate for utilization in water which comprises one part by weight of a spumiferous agent and from about 0.1 to about 5 parts by weight of a water-insoluble but water dispersible, water-swellable polymer in particulate form.

In a second embodiment of the invention, the invention comprises a gelled aqueous foam and method of fighting fires with the same. The gelled foam comprises water having dissolved therein from about 0.1 percent up to about 3 percent by weight of the aforedescribed foaming concentrate and is obtained by spraying the aqueous solution through a foaming nozzle under pressure. Common fire fighting foam nozzles are suitable for this purpose. As will be apparent to those skilled in the art, the pressure available and the amount of the concentrate utilized (the latter determining the consistency of the aqueous system to be foamed) are factors affecting the results achieved. In general, pressures as low as 50 pounds per square inch can be utilized, but preferably pressures as great as 150–350 pounds per square inch are used in generating a foamed aqueous dispersion of the foam forming concentrate.

The spumiferous agent utilized in carrying out the invention is characterized as belonging to the anionic and non-ionic classes of foaming water-soluble, surface active materials. The property of such agents most essential to the invention is their amenability to the generation of aqueous foam, and more particularly the generation of a foam from a liquid base comprising water, the spumiferous agent and water-swellable polymer.

Preferably, the spumiferous agents are surface active materials of the specified classes of which aqueous solutions containing from as little as 0.01 up to as much as about 2 percent by weight of the spumiferous solute and from about 0.1 up to as much as about 2 percent by weight of the water-swellable polymer are foamable upon aeration at superatmospheric pressures to provide aqueous foams having a density within the range from about 0.1 to about 0.8 gram per cubic centimeter. Optimum results are achieved when foams are generated having a density from about 0.2 to about 0.5 gram per cubic centimeter.

As will be apparent to those skilled in the art, the amount of the spumiferous agent necessary to the generation of suitable foams will vary somewhat according to the degree of surface activity possessed by the particular agent used and liquid pressure at the foaming nozzle. Also the amount of the water-swellable polymer utilized may have some effect, particularly at the above-mentioned concentration extremes.

Illustrative of operable spumiferous agents are the fatty acid soaps, such as sodium stearate, and synthetic surface active agents such as sodium N-methyl-N-oleoyl taurate, the monosodium salt of N-lauryl-$\beta$-iminodipropionate, dioctyl sodium sulfosuccinate, sodium $\beta$-oleoylethane sulfonate and sulfated castor oil. Other suitable materials include the alkyl aryl sulfonates including, for example, sodium nonylbenzene sulfonate, potassium dodecylbenzene sulfonate and sodium dodecylbenzene sulfonate. Operable non-ionic surface active materials include ethylene oxide adducts of alkyl phenols, water-soluble, non-ionic ethers of cellulose such as methyl cellulose, methyl hydroxypropyl cellulose and hydroxyethyl cellulose.

The above-mentioned spumiferous materials are only illustrative of those useful in the invention. Non-ionic and anionic surface active materials capable of inducing the desired foam are known to the art. Delineation of these materials is found in such reference as "Detergents and Emulsifiers . . . Up to Date," J. McCutcheon, Morristown, N.J. (1963), and "Emulsions and Foams," Berkman and Eggloff, Reinhold Publishing Corp., New York (1941).

The water-swellable polymer referred to above is characterized as being water-insoluble but dispersible in water. This means the polymer imbibes water but does not form a solution in water which is infinitely dilutable. At some point upon the addition of further amounts of water, the solution will separate into visually distinct gel and water phases. When such polymers are dispersed in water, the solid polymer particles swell to form discrete, particulate, and usually translucent, gels. It is preferred that the gel capacity of the polymer be at least about 20 and preferably about 1,000 to 1,500 or higher.

The gel capacity is determined by dispersing a given weight of the polymer in an amount of water in excess of that required to completely swell the polymer particles. Subsequently the free water is drained from the polymer gel and the weight of the gel ascertained. The quotient of this weight divided by the initial weight of the polymer yields the gel capacity.

Techniques for preparing the water-swellable polymers utilized herein are known. In general such polymers can be described as being lightly cross-linked, i.e., containing from about 0.01 up to as much as 5 percent by weight of a polyunsaturated cross-linking agent which is copolymerized with one or more mono-unsaturated polymerizable monomers. By reference to the water-soluble polymer art, such polymers are prepared by incorporating a small amount of a suitable cross-linking monomer into a polymerization recipe which would otherwise produce a linear, water-soluble polymer. Patents which describe such lightly cross-linked, swellable polymers include U.S. Patents 2,810,716 and 3,021,269 and Canadian Patent 626,501.

Another method for the preparation of a lightly cross-linked, water-swellable polymer involves the use of high energy ionizing radiation to effect the cross-linking. A patent illustrative of the latter method is U.S. Patent 3,090,736.

A preferred class of water-swellable polymers encompasses lightly cross-linked, water-soluble polyalkanes having a plurality of anionic groups attached to the polyalkane polymer chain selected from the group consisting of carboxylate and sulfonate groups. Illustrative of the preferred polymers are lightly cross-linked, monovalent cation salts of polyacrylic, polymethacrylic, polysulfoethyl acrylic, polysulfoethyl methacrylic and polysulfoethyl itaconic acids. Other polymers include lightly cross-linked copolymers of acrylic, methacrylic and sulfoethyl acrylic and the like acids, and monovalent cation salts thereof, with suitable comonomers such as acrylamide, methacrylamide, N-alkyl substituted acrylamides, N-vinyl-2-oxazolidinone and N-vinyl pyrrolidinone. Still other water-swellable polymers are obtained as homopolymers of alkali metal vinyl aromatic sulfonates such as sodium and potassium styrene sulfonates and copolymers thereof with suitable comonomers such as acrylamide, sodium acrylate and potassium methacrylate. Additional comonomers which can be incorporated into the polyalkane along with the carboxylate and sulfonate containing moieties include a variety of water-insoluble comonomers copolymerizable therewith such as styrene, methyl methacrylate, ethyl methacrcylate, acrylonitrile, vinyl acetate and the like. It is necessary, when the comonomer is essentially water-insoluble, to limit the amount used in the preparation of such copolymers to less than that amount which impairs the water solubility of the resulting polymer. Usually it is best if the amount of water-insoluble comonomer is maintained at a level less than about 40 percent by weight of the finished copolymer.

To carry out the invention, the foaming concentrate is incorporated into water which is subsequently sprayed onto a fire in a manner so as to generate a foam. For instance, the concentrate is conveniently added to the water as it flows through a hose. In such event, the addition can be accomplished with the aid of the inductive effect of the flowing water. Preferably the concentrate or at least the polymeric portion thereof is added to the water at some distance, e.g., at least 10 feet prior to the nozzle, in order to permit effective swelling of the polymer prior to spraying through the foaming nozzle. An alternate mode which is equally effective involves simply adding the concentrate or individual components thereof to a water supply tank when water is provided in this manner.

The following examples illustrate the unique effect achieved in accordance with the concept of the present invention, and while details of the examples teach specific and preferred modes of operation, the invention, it is to be understood, is being limited only in the respects as hereinafter delineated in the claims.

EXAMPLE 1

A series of experiments was carried out utilizing sodium lauryl sulfate and a lightly cross-linked, water-swellable acrylamide polymer which were mixed in various relative proportions in water. The particular polymer utilized was obtained by copolymerizing acrylamide with about 0.015 percent by weight, based on the acrylamide, of methylene bisacrylamide and subsequently hydrolyzing the copolymer with sodium hydroxide to convert approximately 30 percent of the initially available carboxamide groups to sodium carboxylate groups. The aqueous mixtures thus constituted were agitated by shaking so as to generate a foam. A portion of the foams thus produced was poured on gasoline to determine how long the foam would remain intact on the gasoline surface. Another portion of the foam was evaluated to determine the extent of its weight loss after draining for a period of one hour. The results of these runs are set forth in the following Table 1 wherein the percentage by weight sodium lauryl sulfate based on the weight of the water is indicated in the column under "Soap" and a like percentage for the lightly cross-linked acrylamide polymer indicated under the column headed "Polymer." The percentage weight loss of the foam in one hour is indicated in the "Drainage" column and the period of time that the foam floated on the gasoline is indicated in the remaining column entitled "Float Time." For the purposes of comparison, several runs were made utilizing the soap without the presence of the polymer. Also a comparative run is included wherein a commercially produced proteinaceous substance was employed to prepare aqueous fire fighting foam.

TABLE 1

| Soap | Polymer | Drainage | Float Time, Minutes |
|---|---|---|---|
| 0.1 | None | 99+ | 0 |
| 0.1 | 0.10 | 64 | 30 |
| 0.1 | 0.25 | 0 | ---------- |
| 0.1 | 0.35 | 0 | 0 |
| 0.1 | 0.45 | 0 | 1 |
| 0.25 | None | 95 | 0 |
| 0.25 | 0.10 | 60 | 20 |
| 0.25 | 0.25 | 16 | 20 |
| 0.25 | 0.35 | 0 | 30 |
| 0.25 | 0.45 | 0 | 20 |
| 0.50 | None | 94 | 0 |
| 0.50 | 0.10 | 64 | 20 |
| 0.50 | 0.25 | 24 | 20 |
| 0.50 | 0.35 | 10 | 20 |
| 0.50 | 0.45 | 0 | 20 |
| None | Commercial Protein | 98 | 0 |

In a similar manner two synthetic detergents, one a sodium salt of a higher alkylbenzene sulfonate and the other sodium dodecyldiphenyl oxide sulfonate, were utilized under comparable conditions in place of the sodium lauryl sulfate to achieve similar results.

EXAMPLE 2

In further experiments, other commercially available soaps and synthetic detergents were utilized in an amount of 0.25 percent by weight of the water in conjunction with the polymer of Example 1. The polymer was used in an amount of 0.15 percent by weight of the water. The mixture of these components with water was mechanically agitated to produce a foam. The drainage and flotation times, measured according to the procedure described above, were determined for each of the foams thus produced. The results listed according to the particular soap utilized are shown in Table 2. The soap used is identified both by descriptive chemical terminology and the brand name under which it is sold.

TABLE 2

| Soap | Brand Name | Drainage, Weight Percent | Float Time, Minutes |
|---|---|---|---|
| Polyethoxyamino acid salt | "Merse" | 24 | 20 |
| Sodium petroleum sulfonate | "Petrosul 742 (62%)" | 24 | 1 |
| Sodium N-methyl-N-oleoyl taurate | "Igepon T-33" | 44 | 10 |
| Organic phosphoric acid ester | "Gafax RE-610" | 66 | 10 |
| Partial Sodium salt of N-lauryl beta-imino-dipropionate | "Deriphat 160-C" | 36 | 30 |
| Ethylene oxide adduct of nonylphenol | "Dowfax 9N9" | 16 | 1 |

While the flotation time of two of the surface active materials was low for the particular combination utilized, the performance in terms of water retention in the foams, i.e., low drainage loss, was excellent in comparison to foams without the water-swellable polymer.

EXAMPLE 3

A mixture containing one part of sodium lauryl sulfate and 1.4 parts of the lightly cross-linked acrylamide polymer utilized in Example 1 was continuously inducted into a moving stream of water and thence through a hose for about 100 feet and ultimately through a foaming nozzle. The induction rate of the mixture was such that the flowing water contained approximately one percent by weight of the gelled foam producing admixture. A tank of gasoline having a surface area of 7 square feet was set on fire. The foam was then sprayed onto the surface of the burning gasoline. The flames were extinguished almost immediately. The foam remained intact and successfully resisted attempts to rekindle the fire with an open flame for an extended period of time.

In further experiments kerosene and benzene fires were likewise successfully extinguished.

Gelled foam prepared as described herein retains a substantial portion of water, and thus an open flame does not readily decompose or dissipate the foam. Such foams can be expected to remain effective vapor and thermal barriers for a period of several minutes under severe conditions of heat and flame from adjacent fire. Commercial foam prepared with a protein based spumiferous agent will decompose in a few seconds under the same conditions.

Good results have been achieved utilizing as little as 0.4 percent by weight of the above concentrate in water and as little as 0.1 percent by weight can be utilized with lesser but nevertheless significant effects.

What is claimed is:

1. A foaming concentrate for use in water which comprises one part by weight of a water-soluble, spumiferous agent and from about 0.1 to about 5 parts of a water-insoluble but water-dispersible, water-swellable polymer characterized by a gel capacity of at least 20.

2. A composition as in claim 1 wherein the spumiferous agent is selected from the group consisting of fatty acid soaps and synthetic, water-soluble anionic and non-ionic surface active materials.

3. A composition as in claim 1 wherein the polymer is a lightly cross-linked, water-swellable polyalkane containing a plurality of substituent anionic moieties selected from the group consisting of carboxylate and sulfonate groups.

4. A gelled aqueous foam composition comprising water having dispersed therein from about 0.1 up to about 3 percent by weight of a foaming combination of one part of a water-soluble, spumiferous agent and from about 0.1 to about 5 parts of a water-insoluble but water-dispersible, water-swellable polymer characterized by a gel capacity of at least 20 and sufficient air entrained in the aqueous solution to yield a foam having a density within the range from about 0.1 to 0.8 gram per cubic centimeter.

5. A method of preparing a gelled aqueous foam which comprises the steps of dispersing in water from about 0.1 to about 3 percent by weight of a foaming composition comprising one part by weight of a water-soluble, spumiferous agent and from 0.1 to about 5 parts of a water-insoluble but water-dispersible, water-swellable polymer characterized by a gel capacity of at least 20 and thereafter generating a foam by spraying the resulting solution through a foaming nozzle under at least 50 pounds per square inch of pressure.

6. A method as in claim 5 wherein the spumiferous agent is selected from the group consisting of fatty acid soaps and synthetic, water-soluble, anionic and non-ionic surface active materials and the water-swellable polymer is a lightly cross-linked polyalkane containing a plurality of substituent anionic moieties selected from the group consisting of carboxylate and sulfonate groups.

7. A method for fighting fires on the surface of inflammable liquids having a density less than that of water which comprises spraying the burning surface of the liquid with a gelled aqueous foam of water having dispersed therein from about 0.1 to about 3 percent by weight of a foaming combination of one part of a water-soluble, spumiferous agent and from about 0.1 to about 5 parts of a water-insoluble but water-dispersible, water-swellable polymer characterized by a gel capacity of at least 20, said foam having a density within the range from about 0.1 to about 0.8 gram per cubic centimeter.

8. A method as in claim 7 wherein the spraying is accomplished by flowing the water having the water-soluble, spumiferous agent and the water-swellable polymer dispersed therein through the nozzle at a pressure of at least about 50 pounds per square inch.

References Cited

UNITED STATES PATENTS

| | | | |
|---|---|---|---|
| 3,229,769 | 1/1966 | Bashaw et al. | 169—1 |
| 2,529,211 | 11/1950 | Busse et al. | 252—3 |
| 3,216,962 | 11/1965 | Gatza | 260—29.64 |

MURRAY TILLMAN, Primary Examiner

MORTON FOELAK, Assistant Examiner

U.S. Cl. X.R.

106—15; 117—135.5; 169—1; 252—306; 260—2.5